(12) United States Patent
Searls et al.

(10) Patent No.: US 10,685,033 B1
(45) Date of Patent: Jun. 16, 2020

(54) SYSTEMS AND METHODS FOR BUILDING AN EXTRACT, TRANSFORM, LOAD PIPELINE

(71) Applicant: Veritas Technologies LLC, Mountain View, CA (US)

(72) Inventors: Kirk Searls, Blairsville, GA (US); Aaron Christensen, Apple Valley, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 4 days.

(21) Appl. No.: 15/431,971

(22) Filed: Feb. 14, 2017

(51) Int. Cl.
G06F 7/00 (2006.01)
G06F 16/25 (2019.01)
G06F 16/54 (2019.01)

(52) U.S. Cl.
CPC ............ *G06F 16/254* (2019.01); *G06F 16/54* (2019.01)

(58) Field of Classification Search
CPC ......... G06F 17/30592; G06F 17/30345; G06F 9/4494; G06F 16/254; G06F 16/54; G06F 16/22
USPC ................ 707/600, 602, 603, 694, 755, 769
See application file for complete search history.

(56) References Cited

U.S. PATENT DOCUMENTS

| | | | |
|---|---|---|---|
| 5,956,028 A | 9/1999 | Matsui et al. | |
| 7,702,866 B2 | 4/2010 | Beardsley et al. | |
| 8,266,616 B1 | 9/2012 | Jacquot et al. | |
| 8,869,140 B2 | 10/2014 | Todorova | |
| 9,075,638 B2 | 7/2015 | Barnett et al. | |
| 9,176,720 B1 | 11/2015 | Day-Richter et al. | |
| 9,203,862 B1 | 12/2015 | Kashyap et al. | |
| 9,213,541 B2 | 12/2015 | Araya et al. | |
| 9,256,467 B1 | 2/2016 | Singh et al. | |
| 9,367,305 B1 | 6/2016 | Kumar | |
| 9,396,061 B1 | 7/2016 | Nair | |
| 9,785,643 B1 | 10/2017 | Patil et al. | |
| 9,888,067 B1 | 2/2018 | Yemini et al. | |
| 9,983,891 B1 * | 5/2018 | Christensen | ........ G06F 9/44505 |
| 10,073,974 B2 | 9/2018 | Hwang et al. | |
| 10,127,030 B1 * | 11/2018 | Mortman | .................. G06F 8/64 |
| 10,169,023 B2 | 1/2019 | Ciano et al. | |

(Continued)

OTHER PUBLICATIONS

Apache Mesos, http://mesos.apache.org, last accessed Jan. 25, 2017.

(Continued)

*Primary Examiner* — Md I Uddin
(74) *Attorney, Agent, or Firm* — FisherBroyles, LLP (57) ABSTRACT

The disclosed computer-implemented method for building an extract, transform, load pipeline may include (i) identifying a plurality of ETL resources available to a user, (ii) categorizing each of the plurality of ETL resources based on at least one characteristic, (iii) provisioning the plurality of ETL resources for use with containers, (iv) presenting a user environment to the user, the user environment including a plurality of container images corresponding to available ETL resources, (v) receiving, from the user, a selection of at least one container image of the plurality of container images, and (vi) running at least one container from the at least one container image, the at least one container utilizing two or more ETL resources of the plurality of ETL resources. Various other methods, systems, and computer-readable media are also disclosed.

20 Claims, 5 Drawing Sheets

(56) References Cited

U.S. PATENT DOCUMENTS

| | | | |
|---|---|---|---|
| 10,360,053 | B1 | 7/2019 | Christensen et al. |
| 2002/0069399 | A1 | 6/2002 | Miloushey et al. |
| 2002/0069400 | A1 | 6/2002 | Miloushev et al. |
| 2002/0120924 | A1 | 8/2002 | Miloushev et al. |
| 2003/0056205 | A1 | 3/2003 | Miloushev et al. |
| 2003/0135850 | A1 | 7/2003 | Miloushev et al. |
| 2004/0148367 | A1 | 7/2004 | Takano |
| 2005/0246357 | A1 | 11/2005 | Geary et al. |
| 2006/0005189 | A1 | 1/2006 | Vega et al. |
| 2008/0028379 | A1 | 1/2008 | Stichnoth |
| 2009/0077422 | A1 | 3/2009 | Khaladkar et al. |
| 2009/0210869 | A1 | 8/2009 | Gebhart |
| 2009/0265712 | A1 | 10/2009 | Herington |
| 2011/0047525 | A1* | 2/2011 | Castellanos ........... G06F 9/4494 717/104 |
| 2011/0191537 | A1 | 8/2011 | Kawaguchi et al. |
| 2011/0197188 | A1 | 8/2011 | Srinivasan |
| 2012/0005153 | A1 | 1/2012 | Ledwich et al. |
| 2014/0181816 | A1 | 6/2014 | Muller |
| 2014/0201374 | A1 | 7/2014 | Ashwood-Smith |
| 2015/0032688 | A1 | 1/2015 | Dayon et al. |
| 2015/0120928 | A1 | 4/2015 | Gummaraju |
| 2015/0269006 | A1* | 9/2015 | Caufield ................. G06F 9/524 718/105 |
| 2015/0310209 | A1 | 10/2015 | Zhang |
| 2015/0363181 | A1 | 12/2015 | Alberti |
| 2016/0098285 | A1 | 4/2016 | Davis et al. |
| 2016/0162320 | A1 | 6/2016 | Singh |
| 2016/0171222 | A1 | 6/2016 | Panchbudhe et al. |
| 2016/0182315 | A1 | 6/2016 | Salokanto et al. |
| 2016/0217176 | A1 | 7/2016 | Haviv et al. |
| 2016/0359955 | A1 | 12/2016 | Gill et al. |
| 2016/0378518 | A1 | 12/2016 | Antony |
| 2017/0060605 | A1 | 3/2017 | Huang et al. |
| 2017/0083541 | A1 | 3/2017 | Mann et al. |
| 2017/0115977 | A1 | 4/2017 | Kim |
| 2017/0154017 | A1 | 6/2017 | Kristiansson et al. |
| 2017/0228246 | A1 | 8/2017 | Kotha |
| 2017/0235609 | A1 | 8/2017 | Wires |
| 2017/0242617 | A1 | 8/2017 | Walsh |
| 2017/0249469 | A1 | 8/2017 | Goyal et al. |
| 2017/0264684 | A1 | 9/2017 | Spillane |
| 2017/0277524 | A1 | 9/2017 | Bhat et al. |
| 2017/0279797 | A1 | 9/2017 | Cross, Jr. |
| 2017/0315795 | A1 | 11/2017 | Keller |
| 2017/0322966 | A1 | 11/2017 | Tran |
| 2017/0337054 | A1 | 11/2017 | Parees |
| 2017/0344292 | A1 | 11/2017 | Sterin |
| 2018/0004570 | A1 | 1/2018 | Maupu |
| 2018/0046457 | A1 | 2/2018 | Branca |
| 2018/0060402 | A1* | 3/2018 | Fabjanski ................ G06F 16/22 |
| 2018/0129479 | A1 | 5/2018 | McPherson et al. |
| 2018/0157505 | A1 | 6/2018 | Kairali et al. |
| 2018/0336113 | A1 | 11/2018 | Asawa et al. |

OTHER PUBLICATIONS

AWS Lambda, https://aws.amazon.com/lambda/, last accessed Jan. 25, 2017.
Docker container support, last accessed Jan. 25, 2017.
Dray—Docker Workflow Engine, http://dray.it/, last accessed Jan. 25, 2017.
Docker ETL Rest server github, https://github.com/bmamlin/docker-etl-rest-server, last accessed Jan. 25, 2017.
Docker Nifi github, https://github.com/jdye64/docker-nifi, last accessed Jan. 25, 2017.
Mesos/Chronos github, https://github.com/mesos/chronos, last accessed Jan. 25, 2017.
Apache Nifi for Docker, https://github.com/apiri/dockerfile-apache-nifi, last accessed Jan. 25, 2017.
Coho Data, https://www.cohodata.com/intel, last accessed Jan. 25, 2017.
Iron.io, https://www.iron.io/, last accessed Jan. 25, 2017.
Jenkins and Docker, https://www.cloudbees.com/continuous-delivery/jenkins-docker, last accessed Jan. 25, 2017.
Pachyderm.io, https://www.pachyderm.io/, last accessed Jan. 25, 2017.
Syncsort ETL, last accessed Jan. 25, 2017.
Talend and Docker, last accessed Jan. 25, 2017.
What is Docker?, https://www.docker.com/what-docker, last accessed Jan. 25, 2017.
Docker Swarm product overview, https://www.docker.com/products/docker-swarm, last accessed Feb. 28, 2017.
Kubernetes Basics, https://kubernetes.io/docs/tutorials/kubernetes-basics/, last accessed Feb. 28, 2017.
Attach a volume to a container while it is running; http://jpetazzo.github.io/2015/01/13/docker-mount-dynamic-volumes/, as accessed Feb. 23, 2017 (Jan. 13, 2015); Github.
Manage data in containers; https://docs.docker.com/engine/tutorials/dockervolumes/#/backup-restore-or-migrate-data-volumes, as accessed Feb. 23, 2017 (Sep. 3, 2016); Docker.
Docker—Data Volumes and Data Containers (4); http://www.tricksofthetrades.net/2016/03/14/docker-data-volumes/, as accessed Feb. 23, 2017 (Mar. 14, 2016); Tricks of the Trades.
Understanding Volumes in Docker; http://container-solutions.com/understanding-volumes-docker/, as accessed Feb. 23, 2017 (Jul. 6, 2015); Container Solutions Amsterdam.
Docker mounting volumes on host; http://stackoverflow.com/questions/25311613/docker-mounting-volumes-on-host, as accessed Feb. 23, 2017 (Aug. 14, 2014); stackoverflow.
Understand images, containers, and storage drivers; https://docs.docker.com/engine/userguide/storagedriver/imagesandcontainers/, as accessed Feb. 23, 2017 (Nov. 7, 2015); Docker.
A Not Very Short Introduction to Docker; https://blog.jayway.com/2015/03/21/a-not-very-short-introduction-to-docker/, as accessed Feb. 23, 2017 (Mar. 21, 2015); jayway.
Use data volume containers; https://getcarina.com/docs/tutorials/data-volume-containers/, as accessed Feb. 23, 2017 (Oct. 23, 2015); Rackspace.
What is the differences between Data Scientist Workbench and Knowledge Anyhow Workbench; http://support.datascientistworkbench.com/knowledgebase/articles/738753-what-is-the-differences-between-data-scientist-wor, as accessed Feb. 14, 2017 (Jan. 13, 2016); Big Data University.
Rodeo Basics; http://rodeo.yhat.com/docs/, as accessed Feb. 14, 2017 (Nov. 14, 2015); Rodeo.
Extract, transform, load; https://en.wikipedia.org/wiki/Extract,_transform,_load, as accessed Feb. 14, 2017 (Aug. 15, 2004); Wikipedia.
What is Docker; http://searchitoperations.techtarget.com/definition/Docker; as accessed Jan. 28, 2017.
Platform as a Service; https://en.wikipedia.org/wiki/Platform_as_a_service; as accessed Jan. 28, 2017.
What is Scale out Storage; http://whatis.techtarget.com/definition/scale-out-storage; as accessed Jan. 28, 2017.
Real-Time Data Analysis with Kubernetes, Redis, and BigQuery; https://cloud.google.com/solutions/real-time/kubernetes-redis-bigquery; as accessed Jan. 28, 2017.
Operating-system-level virtualization; https://en.wikipedia.org/wiki/Operating-system-level_virtualization; as accessed Jan. 28, 2017.
Advanced Analytics Products; http://www.sas.com/en_us/software/analytics.html#view-all-products; as accessed Jan. 31, 2017.
Containerized Cloud Analytics—SAS Analytics for Containers; http://www.sas.com/en_us/software/analytics-for-containers.html; as accessed Jan. 31, 2017.
Container Cluster; https://cloud.google.com/container-engine/docs/clusters/#what_is_a_container_cluster; as accessed Jan. 31, 2017.
Object Storage; https://en.wikipedia.org/wiki/Object_storage; as accessed Jan. 30, 2017.
Clustered file system; https://en.wikipedia.org/wiki/Clustered_file_system; as accessed Jan. 30, 2017.
Ryan Schroeder et al.; Systems and Methods for Automatically Linking Data Analytics to Storage; U.S. Appl. No. 15/428,134, filed Feb. 8, 2017.
Wikipedia; Operating-system-level virtualization; https://en.wikipedia.org/wiki/Operating-system-level_virtualization, as accessed on Feb. 14, 2017.

(56) References Cited

OTHER PUBLICATIONS plugins_volume.md; https://github.com/docker/docker/blob/master/docs/extend/plugins_volume.md, as accessed on Feb. 14, 2017.
Ryan Schroeder et al.; Systems and Methods for Performing Storage Location Virtualization; U.S. Appl. No. 15/432,614, filed Feb. 14, 2017.
Kirk Searls et al.; Systems and Methods for Building an Extract, Transform, Load Pipeline; U.S. Appl. No. 15/431,971, filed Feb. 14, 2017.
Kasireddy, Preethi, "A Beginner-Friendly Introduction to Containers, VMs and Docker," accessed at https://medium.freecodecamp.org/a-beginner-friendly-introduction-to-containers-vms-and-docker-79a9e3e119b, published on Mar. 4, 2016, pp. 21.
Kang et al., "Container and Microservice Driven Design for Cloud Infrastructure DevOps", IEEE International Conference on Cloud Engineering (IC2E), 2016, pp. 202-211.

\* cited by examiner

SYSTEMS AND METHODS FOR BUILDING AN EXTRACT, TRANSFORM, LOAD PIPELINE

BACKGROUND

In the past, large scale computing projects were limited to individuals and enterprises that owned large physical data centers with towering racks of computers. Distributed computing has allowed individuals and organizations to carry out intensive data collection and analysis procedures using one or more remote servers. Data scientists, in particular, are increasingly turning to various networked solutions to extract, transform, and store large amounts of data to be used in data analytics tools. A data scientist or engineer may, for example, build an extract, transform, load (ETL) process, such as an ETL pipeline, to extract data from one or more specified locations, transform the data to properly format the data for further querying and analysis, and load the data into one or more target databases.

While parallel processing tools, such as ETL pipelines, have proven to be powerful data processing tools for data scientists and engineers, they are difficult and time consuming to set up for many individuals and organizations, particularly those that are new to data science technologies. Architecting a new ETL pipeline may require an individual to navigate the configurations of multiple servers (e.g., application versions, operating system versions) and ensure their compatibilities with each other. Often, requirements for various required tools may conflict. The instant disclosure, therefore, identifies and addresses a need for systems and methods for building an ETL pipeline.

SUMMARY

As will be described in greater detail below, the instant disclosure describes various systems and methods for building an ETL pipeline by using container-based technology to facilitate the ETL pipeline construction.

In one embodiment, a computer-implemented method for building an ETL pipeline may include (i) identifying a plurality of ETL resources available to a user, (ii) categorizing each of the plurality of ETL resources based on at least one characteristic of each of the plurality of ETL resources, (iii) provisioning the plurality of ETL resources for use with containers, (iv) presenting a user environment to the user, the user environment including a plurality of container images corresponding to available ETL resources of the plurality of ETL resources, (v) receiving, from the user, a selection of at least one container image of the plurality of container images, and (vi) running at least one container from the at least one container image, the at least one container utilizing two or more ETL resources of the plurality of ETL resources, the at least one container isolating user space of the at least one container from other processes while sharing kernel space with the other processes.

In one embodiment, the plurality of ETL resources may include two or more of a server, a database, a network, and a system. The at least one characteristic of each of the plurality of ETL resources may include at least one of, input/output (I/O) bandwidth, location, processing speed, software compatibility, and available storage space. In some embodiments, provisioning the plurality of ETL resources may include provisioning the ETL resources with a container-based provisioner. Two or more of the plurality of ETL resources may be grouped based on the at least one characteristic of the two or more of the plurality of ETL resources.

In some embodiments, the computer-implemented method may include selecting at least one of the plurality of container images from an image database. The computer-implemented method may further include creating at least one of the plurality of container images. In at least one example, the user environment may further show a plurality of actions to be carried out with respect to the plurality of ETL resources. The plurality of actions may include at least one action to be carried out in each of a plurality of containers respectively corresponding to each of the plurality of container images. The plurality of actions may include at least one of extracting data from a data source, transforming extracted data, and loading transformed data into a target data storage location. Transforming the extracted data may include at least one of reformatting the extracted data, standardizing the extracted data, cleansing the extracted data, and aggregating the extracted data. The computer-implemented method may additionally include receiving, from the user, a selection of at least one action of the plurality of actions to be carried out in a container corresponding to the at least one selected container image.

In at least one embodiment, the user environment may further show a set of ETL resources of the plurality of ETL resources. The set of ETL resources may include the available ETL resources of the plurality of ETL resources. In some examples, the set of ETL resources may include ETL resources of the plurality of ETL resources that are determined to best fit requirements of at least one action to be carried out by the at least one container. Additionally, the set of ETL resources may include at least one ETL resource from each of a plurality of groups ETL resources. In at least one embodiment, the computer-implemented method may additionally include receiving, from the user, a selection of the two or more ETL resources utilized by the at least one container. The computer-implemented method may further include determining that the two or more ETL resources of the plurality of ETL resources best fit requirements of at least one action to be carried out by the at least one container.

In one example, a system for building an ETL pipeline may include several modules stored in memory, including (i) an identifying module, stored in memory, that identifies a plurality of ETL resources available to a user, (ii) a categorizing module, stored in memory, that categorizes each of the plurality of ETL resources based on at least one characteristic of each of the plurality of ETL resources, (iii) a provisioning module, stored in memory, that provisions the plurality of ETL resources for use with containers, (iv) an interface module, stored in memory, that presents a user environment to a user, the user environment including a plurality of container images corresponding to available ETL resources of the plurality of ETL resources, (v) a receiving module, stored in memory, that receives, from the user, a selection of at least one container image of the plurality of container images, (vi) a running module, stored in memory, that runs at least one container from the at least one container image, the at least one container utilizing two or more ETL resources of the plurality of ETL resources, the at least one container isolating user space of the at least one container from other processes while sharing kernel space with the other processes, and (vii) at least one processor that executes the identifying module, the categorizing module, the provisioning module, the interface module, the receiving module, and the running module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a plurality of ETL resources available to a user, (ii) categorize each of the plurality of ETL resources based on at least one characteristic of each of the plurality of ETL resources, (iii) provision the plurality of ETL resources for use with containers, (iv) present a user environment to the user, the user environment including a plurality of container images corresponding to available ETL resources of the plurality of ETL resources, (v) receive, from the user, a selection of at least one container image of the plurality of container images, and (vi) run at least one container from the at least one container image, the at least one container utilizing two or more ETL resources of the plurality of ETL resources, the at least one container isolating user space of the at least one container from other processes while sharing kernel space with the other processes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for building an ETL pipeline. As will be explained in greater detail below, the systems and methods described herein may provide a user with a user environment that facilitates assembly of ETL resources into an ETL pipeline, thereby enabling the user to more quickly and easily build an ETL pipeline to suit their needs. By categorizing and provisioning the ETL resources, and then utilizing the resources with container-based applications, the systems and methods described herein may ensure that the resources used in the ETL pipeline are the best fit for the particular ETL operation selected by the user while avoiding potential conflicts between incompatible software tools and systems.

Figure 1:
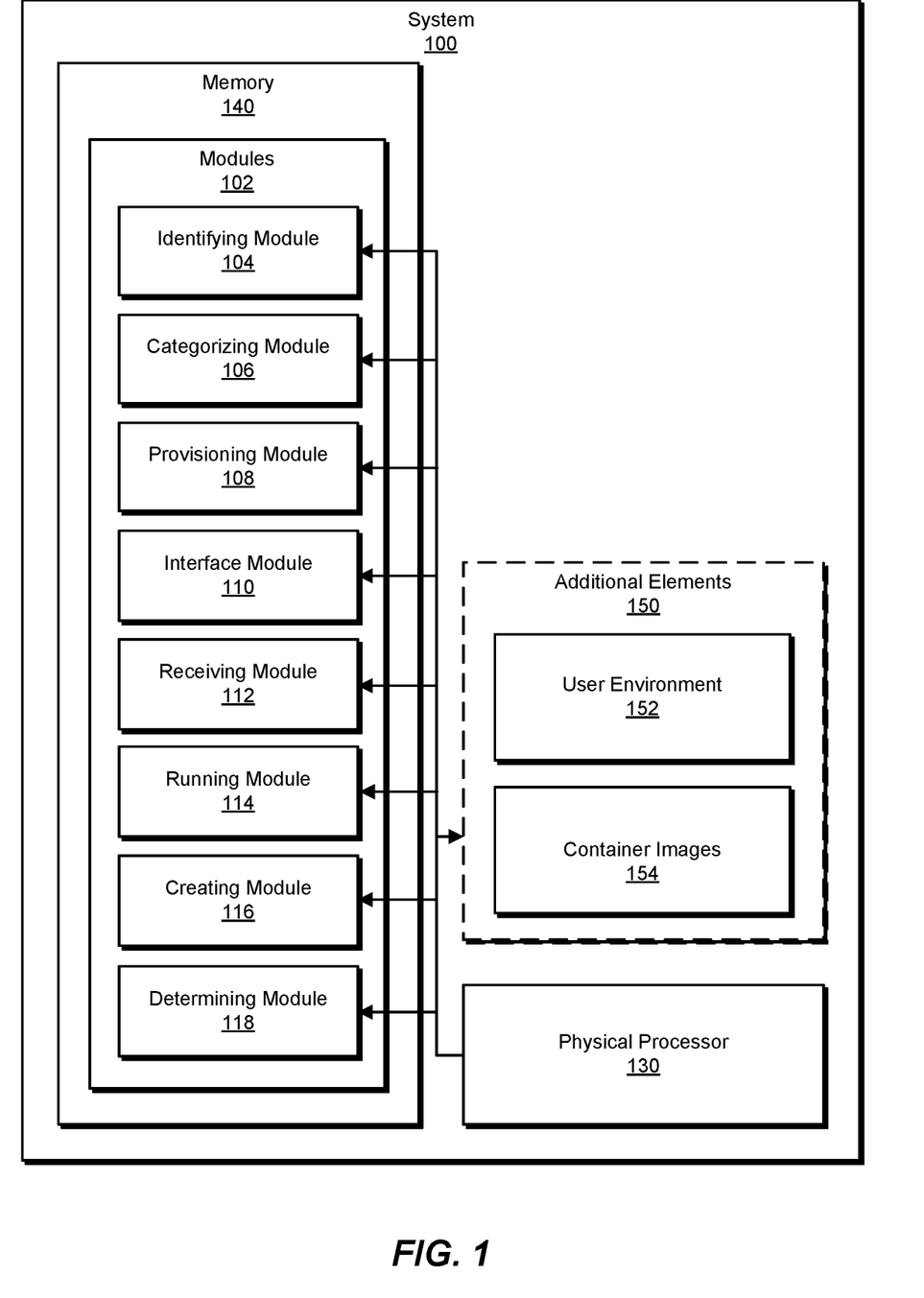
FIG. 1 is a block diagram of an example system for building an ETL pipeline.
Figure 2:
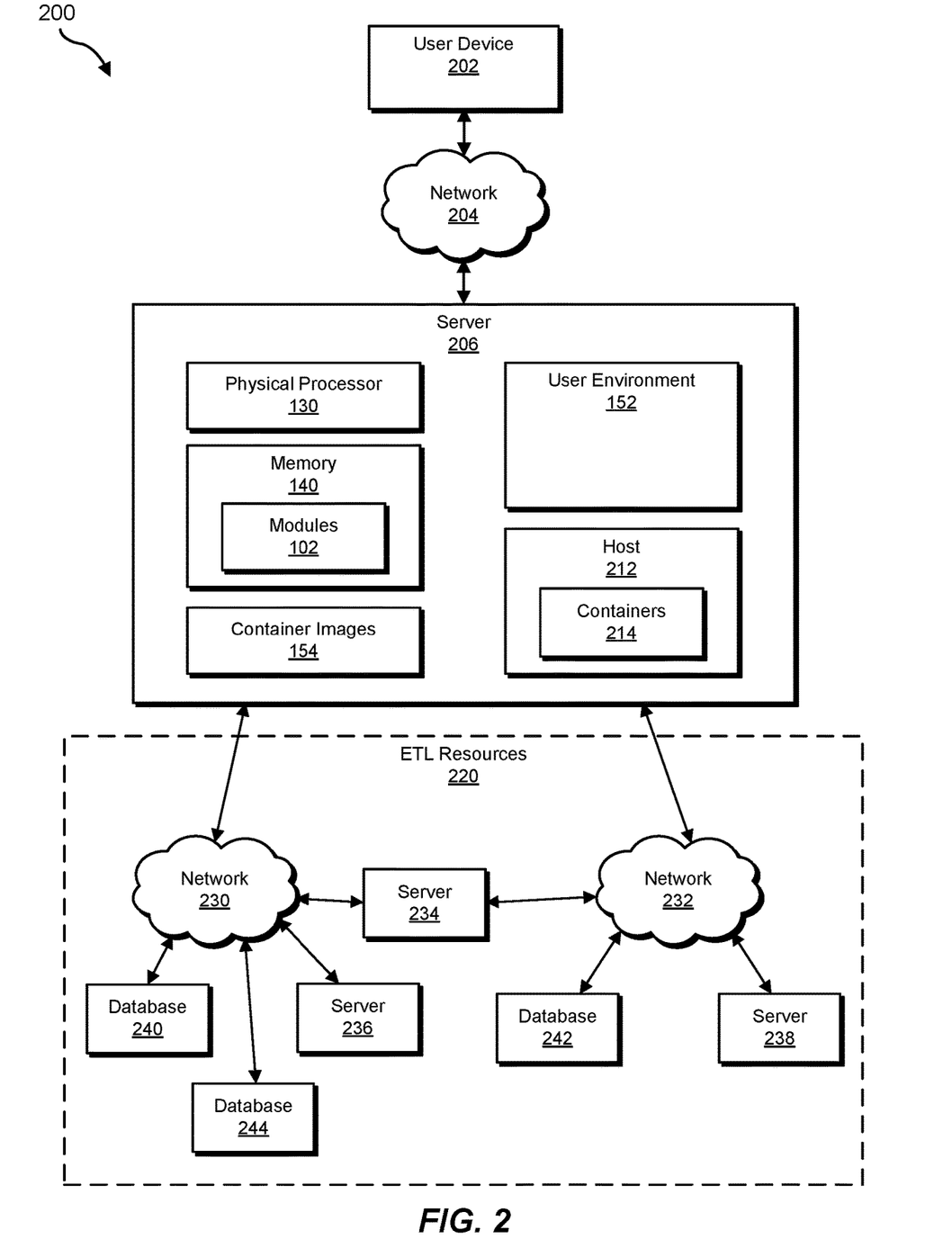
FIG. 2 is a block diagram of an additional example system for building an ETL pipeline.
Figure 4:
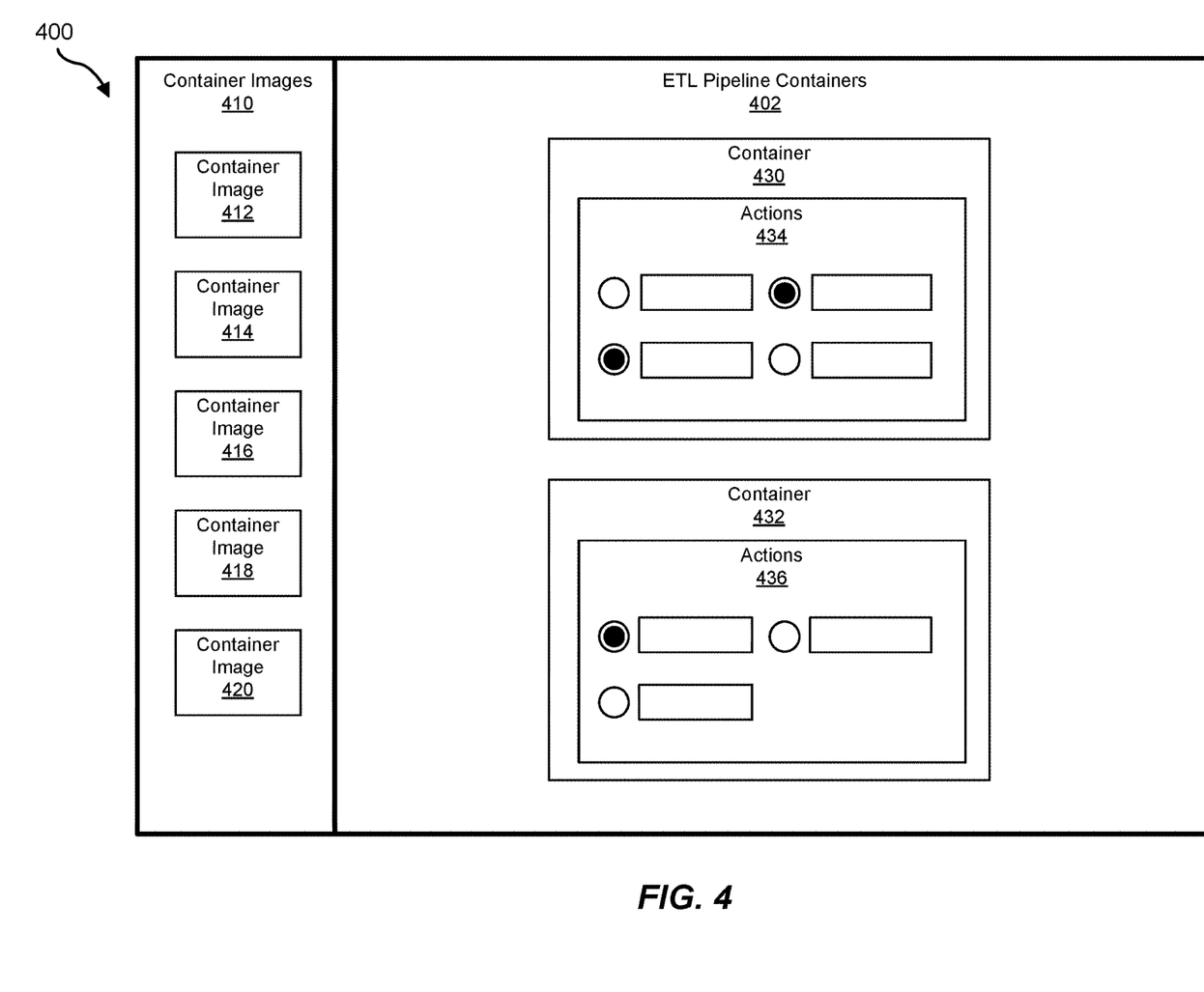
FIG. 4 is an illustration of an example user environment presented to a user.
Figure 5:
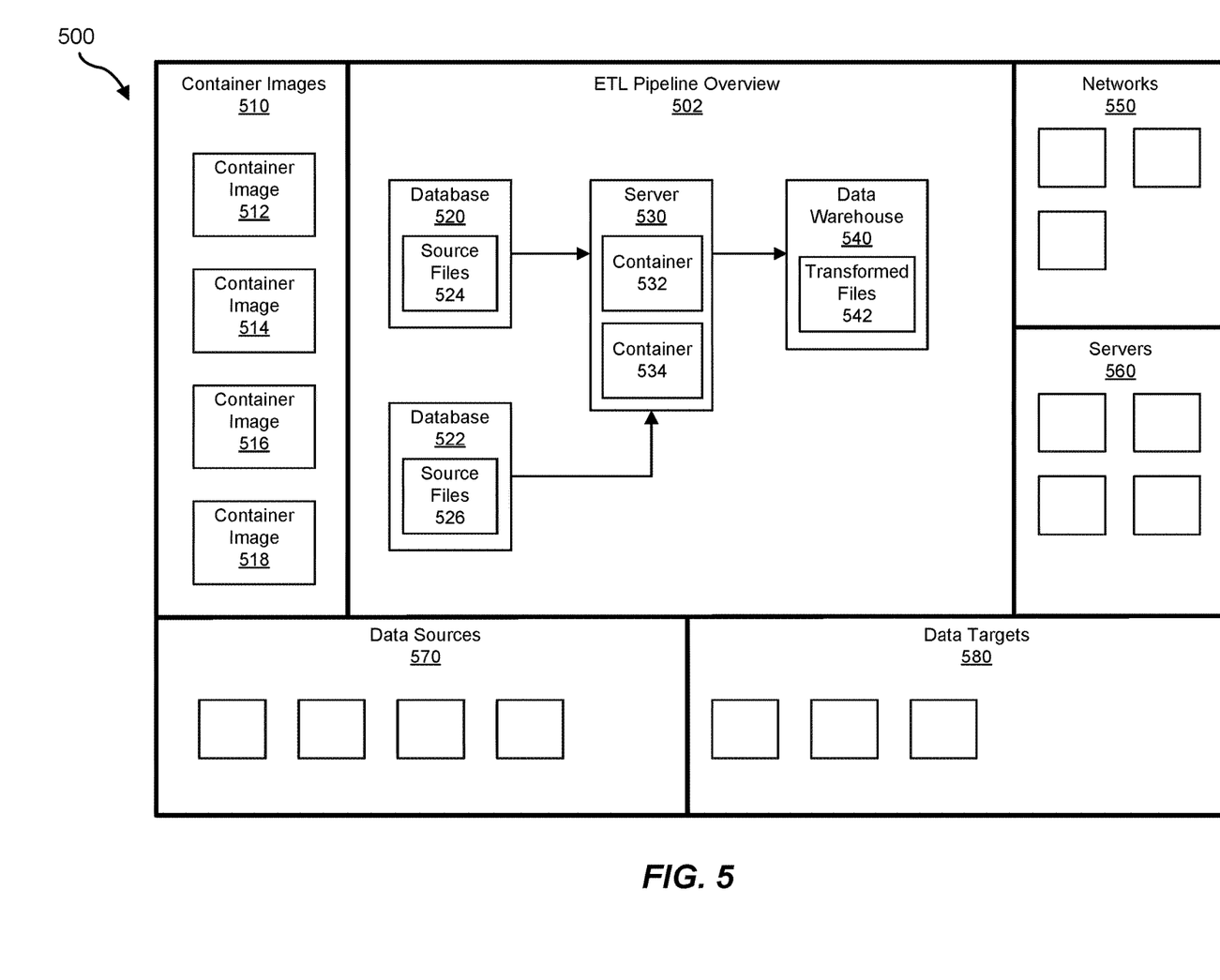
FIG. 5 is an illustration of an example user environment presented to a user.

The following will provide, with reference to FIGS. 1-2, detailed descriptions of example systems for building an ETL pipeline. Detailed descriptions of corresponding computer-implemented methods will also be provided in connection with FIG. 3. In addition, detailed descriptions of example user environments presented to a user are illustrated in FIGS. 4 and 5.

FIG. 1 is a block diagram of an example system 100 for building an ETL pipeline. As illustrated in this figure, example system 100 may include one or more modules 102 for performing one or more tasks. As will be explained in greater detail below, modules 102 may include an identifying module 104 that identifies a plurality of ETL resources that are available to a user. Exemplary system 100 may additionally include a categorizing module 106 that categorizes ETL resources based on characteristics of the ETL resources. Exemplary system 100 may also include a provisioning module 108 that provisions the plurality of ETL resources based on characteristics of the ETL resources. Exemplary system 100 may further include an interface module 110 that presents a user environment to a user. Exemplary system 100 may additionally include a receiving module 112 that receives user input. Further, exemplary system 100 may include a running module 114 that runs containers from container images. In various embodiments, exemplary system 100 may include a creating module 116 that creates a container image. Additionally, exemplary system 100 may include a determining module 118 that determines ETL resources that are a best fit for actions to be carried out by containers. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., user device 202, server 206, and/or servers 234, 236, and/or 238). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate building an ETL pipeline. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 150, such as user environment 152 and container images 154. User environment 152 generally represents any type or form of interactive environment presented to a user. For example, user environment 152 may include a user interface that is presented to a user on a display device. In various embodiments, user environment 152 may be presented to the user in response to an application program interface (API) call, such as a representational state transfer (REST or RESTful) API call. Additionally, container images 154 each generally represent a filesystem and parameters for running a container.

The term "container," as used herein, generally refers to any type of virtual environment (e.g., DOCKER container) that does not include an entire operating system but does include enough resources to execute at least one application. In some embodiments, the resources and/or processes within a container may be isolated from resources and/or processes outside the application container and/or the application container may have a default configuration that specifies that communication from the application container to outside resources and/or processes must pass through the kernel of the application container's host. Containers may each be run from a separate container image that includes all of the necessary files and parameters.

Example system 100 in FIG. 1 may be implemented in a variety of ways. For example, all or a portion of example system 100 may represent portions of example system 200 in FIG. 2. As shown in FIG. 2, system 200 may include a user device 202 in communication with a server 206 via a network 204. Additionally, server 206 and/or user device 202 may be in communication with various ETL resources 220 available for building an ETL pipeline. ETL resources 220 may include, for example, networks 230 and 232, servers 234, 236, and 238, and databases 240, 242, and 244. ETL resources 220 may additionally or alternatively include any other suitable computing systems, without limitation. In one example, all or a portion of the functionality of modules 102, user environment 152, and/or container images 154 may be performed by user device 202, server 206, servers 234, 236, and/or 238, and/or any other suitable computing system. As will be described in greater detail below, one or more of modules 102 from FIG. 1 may, when executed by at least one processor of user device 202, server 206, and/or servers 234, 236, and/or 238, enable building an ETL pipeline by user device 202, server 206, and/or servers 234, 236, and/or 238.

User device 202 generally represents any type or form of user device capable of reading computer-executable instructions. Examples of user device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device. In some embodiments, user device 202 may represent an application server and/or database server configured to provide various database services and/or run certain software applications.

Server 206 generally represents any type or form of computing device that is capable of reading computer-executable instructions and that provides functionality for other programs or devices. Examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another. In at least one embodiment, server 206 may include physical processor 130, memory 140 including modules 102, user environment 152, and container images 154. In some embodiments, user environment 152 and/or container images 154 may be presented to a user on user device 202. Additionally, server 206 may include a host 212 that hosts one or more containers 214 run from one or more of container images 154.

The term "host," as used herein, generally refers to any computing system capable of hosting one or more containers. In some embodiments, a host may include physical hardware. Additionally or alternatively, a host may include a virtualized computing system. In some embodiments, a host may be a remotely managed server (i.e., on the cloud).

Servers 234, 236, and/or 238 each generally represent any type or form of computing device that is capable of reading computer-executable instructions and that provides functionality for other programs or devices. Examples of servers 234, 236, and/or 238 include, without limitation, storage servers, database servers, application servers, and/or web servers configured to run certain software applications and/or provide various storage, database, and/or web services. Although illustrated as single entities in FIG. 2, each of servers 234, 236, and/or 238 may include and/or represent a plurality of servers that work and/or operate in conjunction with one another.

Network 204 generally represents any medium or architecture capable of facilitating communication or data transfer. In one example, network 204 may facilitate communication between user device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Networks 230 and 232 each generally represent any medium or architecture capable of facilitating communication or data transfer. In one example, networks 230 and 232 may facilitate communication between server 206 and/or user device 202 and one or more of servers 234, 236, and 238 and databases 240, 242, and 244. In this example, networks 230 and 232 may facilitate communication or data transfer using wireless and/or wired connections. Examples of networks 230 and 232 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
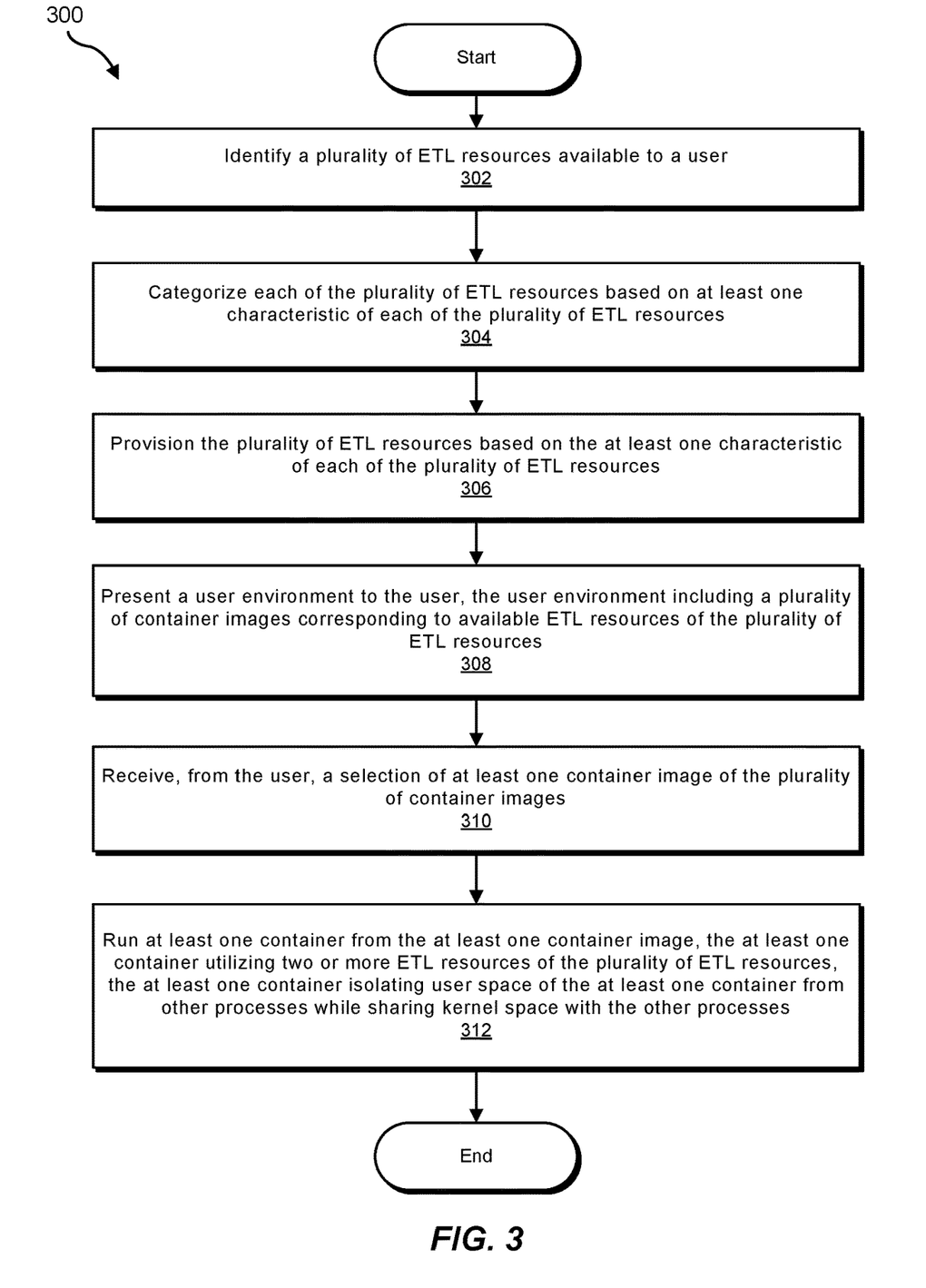
FIG. 3 is a flow diagram of an example method for building an ETL pipeline.

FIG. 3 is a flow diagram of an example computer-implemented method 300 for building an ETL pipeline. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a plurality of ETL resources available to a user. For example, identifying module 104 may, as part of server 206 in FIG. 2, identify a plurality of ETL resources 220 available to a user of user device 202.

Identifying module 104 may identify the plurality of ETL resources available to the user in a variety of ways. For example, the user may indicate servers (e.g., servers 234, 236, and 238), networks (e.g., networks 230 and 232), databases (e.g., databases 240, 242, and 244), and/or any other suitable ETL resources that the user wishes to be available for ETL activities, such as building an ETL pipeline.

The term "ETL pipeline," as used herein, generally refers to a framework of resources that are processed in parallel to extract data from multiple sources, transform the data to get the data in the desired form for analysis and/or reporting, and load the transformed data into a target data storage location. Examples of transformation processes that may be applied to the extracted data may include, for example, reformatting, standardization, cleansing, aggregation, and/or any other suitable transformation activities specified by a user. Data extracted from various sources and having different formats may be transformed to data having a common output format. An ETL pipeline may include components that extract, transform, and load data in discrete batch jobs or in realtime or near-realtime.

Databases 240, 242, and 244 may include, for example, source databases that store data to be extracted and transformed and/or target databases that are used for loading and storage of transformed data for use in data analysis and reporting. Data to be extracted and transformed by an ETL pipeline may additionally or alternatively come from any suitable source, including non-database systems. In some embodiments, source databases and/or target databases may include at least one of a data warehouse, a data store, a data mart, a distributed file system, such as a Hadoop Distributed File System (HDFS), an object-based storage system, and/or any other suitable storage system, without limitation.

At step 304 one or more of the systems described herein may categorize each of the plurality of ETL resources based on at least one characteristic of each of the plurality of ETL resources. For example, categorizing module 106 may, as part of server 206 in FIG. 2, categorize each of the plurality of ETL resources 220 based on at least one characteristic of each of the plurality of ETL resources 220.

Categorizing module 106 may categorize each of the plurality of ETL resources in a variety of contexts. For example, categorizing module 106 may categorize each of the plurality of ETL resources 220 based on input/output bandwidth, location, processing speed, software compatibility, available storage space, and/or any other suitable characteristics that may affect the capabilities of an ETL pipeline including ETL resources 220. In some examples, the method may further include grouping two or more of the plurality of ETL resources based on the at least one characteristic of the two or more of the plurality of ETL resources. For example, servers may be grouped based on processing speed and/or bandwidth and target databases may be grouped based on available storage space.

At step 306 one or more of the systems described herein may provision the plurality of ETL resources for use with containers. For example, provisioning module 108 may, as part of server 206 in FIG. 2, provision the plurality of ETL resources 220 for use with containers 214.

Provisioning module 108 may provision the plurality of ETL resources in a variety of ways. For example, provisioning module 108 may include a container-based provisioner (e.g., DOCKER, MESOS, etc.) that provisions the plurality of ETL resources 220 based on various characteristic of the plurality of ETL resources 220. Provisioning module 108 may, for example, provision servers 206, 234, 236, and/or 238 to host one or more containers for use in the ETL pipeline and/or may provision database 240, 242, and/or 244 for loading and storage of transformed data.

At step 308 one or more of the systems described herein may present a user environment to the user, the user environment including a plurality of container images corresponding to available ETL resources of the plurality of ETL resources. For example, interface module 110 may, as part of server 206 in FIG. 2, present user environment 152 to the user of user device 202, user environment 152 including a plurality of container images 154 corresponding to available ETL resources of the plurality of ETL resources 220.

Interface module 110 may present the user environment to the user in a variety of ways, as will be described in greater detail below with relation to FIGS. 4 and 5. In at least one embodiment, user environment 152 may be presented to a user on user device 202. For example, user environment 152 may include a user interface that is presented to the user on a display of user device 202. For example, server 206 may present a user interface to the user via user device 202. In various embodiments, user environment 152 may be generated in response to an API call, such as a RESTful API. For example, user environment 152 may be generated and/or presented on user device 202 in response to a RESTful API call made to Server 206 and/or one or more of ETL Resources 220 requesting information related to containers 214 and/or one or more of ETL Resources 220.

User environment 152 may show a plurality of container images 154 corresponding to containers including applications and parameters for building and running an ETL pipeline. In at least one embodiment, user environment 152 may enable a user to select desired container images and/or actions that the user wishes to carry out, and the corresponding containers may carry out the desired actions with little or no additional input from the user.

In some embodiments, at least one of the plurality of container images may be obtained from an image database. For example, a user may select existing container images from an image database, and these container images may be displayed in user environment 152 and may be available for use in the ETL pipeline. In one embodiment, one or more of the systems described herein may create at least one of the plurality of container images that is displayed in user environment 152. For example, creating module 116 may, as part of server 206 in FIG. 2, create one or more container images 154 for use in the ETL pipeline.

FIGS. 4 and 5 illustrate exemplary user environments presented to a user. In at least one embodiment, as shown in FIG. 4, a user environment 400 may include a region showing a plurality of available container images 410 for use in an ETL pipeline. For example, container images 412, 414, 416, 418, and 420 may be available to the user for building the ETL pipeline. Each of container images 410 may include unique applications and/or parameters. For example, different container images 410 may be configured to be used for different ETL operations and/or may be configured to be used with specified ETL resources. In some embodiments, each of container images may be displayed in user environment 400 with identifying and/or descriptive information, such as information concerning the particular actions they are configured to execute and/or the categories of ETL resources they are configured to be utilized with.

Returning to FIG. 3, at step 310 one or more of the systems described herein may receive, from the user, a selection of at least one container image of the plurality of container images. For example, receiving module 112 may, as part of server 206 in FIG. 2, receive, from the user via user environment 152, a selection of at least one container image of the plurality of container images 154.

Receiving module 112 may receive the selection of the at least one container image of the plurality of container images in a variety of ways. For example, a user may make a selection of at least one container of the plurality of container images 154 via a user interface displayed to the user on user device 202 as part of user environment 152. In at least one embodiment, user environment 400 illustrated in FIG. 4 may enable a user to select one or more of container images 410, and receiving module 112 may receive the selection.

In some embodiments, the user environment may further show a plurality of actions to be carried out with respect to the plurality of ETL resources. For example, user environment 152 may show a plurality of actions to be carried out with respect to the plurality of ETL resources 220. The plurality of actions may include at least one of extracting data from a data source, transforming extracted data, and loading transformed data into a target data storage location. Transforming the extracted data may include at least one of reformatting the extracted data, standardizing the extracted data, cleansing the extracted data, and aggregating the extracted data.

As illustrated, for example, in FIG. 4, user environment 400 may include a region showing one or more ETL pipeline containers 402 that are to be run as part of the ETL pipeline based on the container images selected by the user. For example, after the user selects container image 412, container 430 and corresponding actions may be displayed in ETL pipeline containers 402. Additionally, for example, after the user selects container image 418, container 432 and corresponding actions may be displayed in ETL pipeline containers 402. One or more actions may be displayed in conjunction with each container. Actions 434 may, for example, be actions that can be carried out by one or more applications in container 430 and actions 436 may be actions that can be carried out by one or more applications in container 432. Actions 434 and 436 may include, for example, extraction, transformation, and/or loading actions to be carried out in the ETL pipeline.

Returning to FIG. 3, at step 312 one or more of the systems described herein may run at least one container from the at least one container image, the at least one container utilizing two or more ETL resources of the plurality of ETL resources, the at least one container isolating user space of the at least one container from other processes while sharing kernel space with the other processes. For example, running module 114 may, as part of server 206 in FIG. 2, run at least one container 214 from the at least one container image 154, the at least one container 214 utilizing two or more ETL resources of the plurality of ETL resources 220, the at least one container 214 isolating user space of the at least one container 214 from other processes while sharing kernel space with the other processes.

Running module 114 may run the at least one container from the at least one container image in a variety of ways. For example, after a user selects container images from container images 410 in FIG. 4, along with any corresponding actions, the user may direct running module 114 to run containers 430 and 436 corresponding to the selected container images. Running module 114 may then run each of the containers from the selected container images. The containers may use two or more of ETL resources 220 to perform the selected actions, such as the extraction, transformation, and loading actions, as part of the ETL pipeline.

In some embodiments, one or more of the systems described herein may determine that the two or more ETL resources of the plurality of ETL resources best fit requirements of at least one action to be carried out by the at least one container. For example, determining module 118 may, as part of server 206, determine that the two or more ETL resources of the plurality of ETL resources 220 best fit one or more requirements of at least one action to be carried out by the at least one container of containers 214.

Determining module 118 may determine that the two or more ETL resources of the plurality of ETL resources best fit one or more requirements of at least one action to be carried out by the at least one container of containers in a variety of ways. For example, determining module 118 may determine which of ETL resources 220 are available during a specified time period for carrying out the ETL pipeline processes corresponding to the selected containers. Additionally, determining module 118 may determine which of ETL resources 220 have the highest available bandwidths and/or processing capabilities. Determining module 118 may also use any other suitable criteria, without limitation, to determine the best fit. In at least one example, one or more of the systems described herein may automatically assign the two or more ETL resources, such as the ETL resources best fitting the one or more requirements, to the ETL pipeline. In some embodiments, one or more of the systems described herein may provide an indication to the user of the best fitting ETL resources. The user may then manually select the desired ETL resources via, for example, user environment 152.

In some of the embodiments, the user environment may further show a set of ETL resources of the plurality of ETL resources. For example, interface module 110 may, as part of server 206, show a set of ETL resources of the plurality of ETL resources 220. The set of ETL resources may include some or all of the plurality of ETL resources 220. For example, the set of ETL resources may include one or more ETL resources that are available for use in the ETL pipeline. In some embodiments, the set of ETL resources may include ETL resources of the plurality of ETL resources 220 that are determined to best fit requirements of at least one action to be carried out by the at least one container 214. In at least one embodiment, the set of ETL resources may include at least one ETL resource from each of a plurality of groups of ETL resources.

FIG. 5 is an illustration of an exemplary user environment presented to a user. As shown in FIG. 5, a user environment 500 may include a region showing a plurality of available container images 510 for use in an ETL pipeline. For example, container images 512, 514, 516, and 518 may be available to the user. Each of container images 510 may include unique applications and/or parameters. For example, different container images 510 may be configured to be used for different ETL operations and/or may be configured to be used with specified ETL resources. The container images may be displayed in user environment 500 with identifying and/or descriptive information, such as information concerning the particular actions they are configured to execute and/or the categories of ETL resources they are configured to be utilized with.

User environment 500 may also include an ETL pipeline overview 502 showing an overview of the ETL pipeline, including ETL resources and containers used in the ETL pipeline and relationships between the selected ETL resources. In some embodiments, a user may utilize user environment 500 to select one or more container images 510 for the ETL pipeline. As shown in FIG. 5, containers 532 and 534 corresponding to selected container images of container images 510, may be hosted on server 530. In some embodiments, a user may select one or more actions to perform in container 532 and/or container 534.

Additionally, user environment 500 may include regions showing available ETL resources, such as networks 550, servers 560, and databases, which may be displayed under data sources 570 and data targets 580 (e.g., data warehouses, data marts, data stores, etc.). The user may select one or more ETL resources to use in the ETL pipeline. For example, the user may select databases 520 and 522 from data sources 570 for the ETL pipeline. Databases 520 and 522 may respectively include source files 524 and 526 to be extracted and transformed. The user may, for example, additionally select server 530 from servers 560 for the ETL pipeline. As shown in FIG. 5, containers 532 and 534 may each be hosted on server 530. Containers 532 and 534 may execute various actions, including actions to transform data extracted from database 520 and/or database 522. In some embodiments, additional servers may be selected and different containers may be hosted on separate servers. The user may also select, for example, data warehouse 540 from data targets 580. Data warehouse 540 may be used as a load destination for storing transformed data, such as transformed files 542, for analysis and reporting.

The disclosed systems and methods may provide a user with a user environment that facilitates assembly of ETL resources into an ETL pipeline, thereby enabling the user to more quickly and easily build an ETL pipeline to suit their needs. By categorizing and provisioning the ETL resources, and then running the resources using container-based applications, the systems and methods described herein may ensure that the resources used in the ETL pipeline are the best fit for the particular ETL operation selected by the user while avoiding potential conflicts between incompatible software tools and systems. Moreover, because the ETL pipeline is assembled using container-based tools, the user may assemble the ETL pipeline without encountering software version and compatibility conflicts. Container images may be updated as needed, allowing evening inexperience users to assemble an ETL pipeline. Additionally, the disclosed systems and methods may facilitate selection of provisioned ETL resources that best fit the needs of the ETL containers and/or actions selected by the user, ensuring that the ideal combination of resources are utilized.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for building an extract, transform, load (ETL) pipeline, at least a portion of the method being performed by a computing device comprising at least one processor, the method comprising:
    identifying a plurality of ETL resources employable in the ETL pipeline that are available to a user;
    categorizing each of the plurality of ETL resources based on at least one characteristic of each of the plurality of ETL resources that affects a capability of the ETL pipeline when employed in the ETL pipeline;
    provisioning the plurality of ETL resources for use with containers based on the at least one characteristic of each of the plurality of ETL resources;
    presenting a user environment to the user, the user environment including a plurality of container images corresponding to available ETL resources of the plurality of ETL resources;
    receiving, from the user, a selection of at least one container image of the plurality of container images, wherein the at least one container image includes at least one application that performs at least one action to be carried out in the ETL pipeline;
    determining two or more ETL resources from the plurality of ETL resources that are best fit to carry out the at least one action based on the at least one characteristic of each of the plurality of ETL resources; and
    running each of at least one container from the at least one container image that includes files and parameters for running the at least one container, the at least one container utilizing the two or more ETL resources of the plurality of ETL resources, wherein at least one of the two or more ETL resources comprises at least one server that hosts the at least one container, the at least one container isolating user space of the at least one container from other processes while sharing kernel space with the other processes on the at least one server.

2. The computer-implemented method of claim 1, wherein the plurality of ETL resources comprise two or more of:
    a server;
    a database;
    a network; and
    a system.

3. The computer-implemented method of claim 1, wherein the at least one characteristic of each of the plurality of ETL resources comprises at least one of:
    input/output bandwidth;
    location;
    processing speed;
    software compatibility; and
    available storage space.

4. The computer-implemented method of claim 1, wherein provisioning the plurality of ETL resources comprises provisioning the ETL resources with a container-based provisioner.

5. The computer-implemented method of claim 1, further comprising grouping two or more of the plurality of ETL resources based on the at least one characteristic of the two or more of the plurality of ETL resources.

6. The computer-implemented method of claim 1, further comprising obtaining at least one of the plurality of container images from an image database.

7. The computer-implemented method of claim 1, further comprising creating at least one of the plurality of container images.

8. The computer-implemented method of claim 1, wherein the user environment further shows a plurality of actions to be carried out with respect to the plurality of ETL resources, wherein the plurality of actions comprises the at least one action.

9. The computer-implemented method of claim 8, wherein the plurality of actions comprises one or more actions to be carried out in each of a plurality of containers respectively corresponding to each of the plurality of container images.

10. The computer-implemented method of claim 8, further comprising receiving, from the user, a selection of the at least one action of the plurality of actions to be carried out in a container corresponding to the at least one container image.

11. The computer-implemented method of claim 8, wherein the plurality of actions comprises at least one of:
    extracting data from a data source;
    transforming extracted data; and
    loading transformed data into a target data storage location.

12. The computer-implemented method of claim 11, wherein transforming the extracted data comprises at least one of:
    reformatting the extracted data;
    standardizing the extracted data;
    cleansing the extracted data; and
    aggregating the extracted data.

13. The computer-implemented method of claim 1, wherein the user environment further shows a set of ETL resources of the plurality of ETL resources.

14. The computer-implemented method of claim 13, wherein the set of ETL resources comprises the available ETL resources of the plurality of ETL resources.

15. The computer-implemented method of claim 13, wherein the set of ETL resources comprises ETL resources of the plurality of ETL resources that are determined to best fit requirements of at least one action to be carried out by the at least one container.

16. The computer-implemented method of claim 13, wherein the set of ETL resources comprises at least one ETL resource from each of a plurality of groups of ETL resources.

17. The computer-implemented method of claim 13, further comprising receiving, from the user, a selection of at least one of the two or more ETL resources utilized by the at least one container.

18. The computer-implemented method of claim 1, wherein the user environment includes a graphical representation of the ETL pipeline including the two or more ETL resources and the at least one container.

19. A system for building an ETL pipeline, the system comprising:
    an identifying module, stored in memory, that identifies a plurality of ETL resources employable in the ETL pipeline that are available to a user;
    a categorizing module, stored in memory, that categorizes each of the plurality of ETL resources based on at least one characteristic of each of the plurality of ETL resources that affects a capability of the ETL pipeline when employed in the ETL pipeline;
    a provisioning module, stored in memory, that provisions the plurality of ETL resources for use with containers based on the at least one characteristic of each of the plurality of ETL resources;
    an interface module, stored in memory, that presents a user environment to the user, the user environment including a plurality of container images corresponding to available ETL resources of the plurality of ETL resources;
    a receiving module, stored in memory, that receives, from the user, a selection of at least one container image of the plurality of container images, wherein the at least one container image includes at least one application that performs at least one action to be carried out in the ETL pipeline;
    a determining module, stored in memory, that determines two or more ETL resources from the plurality of ETL resources that are best fit to carry out the at least one action based on the at least one characteristic of each of the plurality of ETL resources;
    a running module, stored in memory, that runs each of at least one container from the at least one container image that includes files and parameters for running the at least one container, the at least one container utilizing two or more ETL resources of the plurality of ETL resources, wherein at least one of the two or more ETL resources comprises at least one server that hosts the at least one container, the at least one container isolating user space of the at least one container from other processes while sharing kernel space with the other processes on the at least one server; and
    at least one processor that executes the identifying module, the categorizing module, the provisioning module, the interface module, the receiving module, the determining module, and the running module.

20. A non-transitory computer-readable medium comprising one or more computer-executable instructions that, when executed by at least one processor of a computing device, cause the computing device to:
    identify a plurality of ETL resources employable in an ETL pipeline that are available to a user;
    categorize each of the plurality of ETL resources based on at least one characteristic of each of the plurality of ETL resources that affects a capability of the ETL pipeline when employed in the ETL pipeline;
    provision the plurality of ETL resources for use with containers based on the at least one characteristic of each of the plurality of ETL resources;
    present a user environment to the user, the user environment including a plurality of container images corresponding to available ETL resources of the plurality of ETL resources;
    receive, from the user, a selection of at least one container image of the plurality of container images, wherein the at least one container image includes at least one application that performs at least one action to be carried out in the ETL pipeline;
    determine two or more ETL resources from the plurality of ETL resources that are best fit to carry out the at least one action based on the at least one characteristic of each of the plurality of ETL resources; and
    run each of at least one container from the at least one container image that includes files and parameters for running the at least one container, the at least one container utilizing two or more ETL resources of the plurality of ETL resources, wherein at least one of the two or more ETL resources comprises at least one server that hosts the at least one container, the at least one container isolating user space of the at least one container from other processes while sharing kernel space with the other processes on the at least one server.

\* \* \* \* \*